(12) United States Patent
Kawamoto

(10) Patent No.: US 6,615,346 B1
(45) Date of Patent: Sep. 2, 2003

(54) SYSTEM PROVIDING SWITCHING MEANS ON PRINT SETUP PREVIEW SCREEN THEREBY SWITCHING TO ANOTHER PREVIEW SCREEN CORRESPONDING TO ANOTHER SET SHEET, ALTERING SETTINGS

(75) Inventor: Hirokazu Kawamoto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/512,356

(22) Filed: Feb. 24, 2000

(30) Foreign Application Priority Data

Feb. 26, 1999 (JP) .............................. 11-050599

(51) Int. Cl.[7] .............................. G06F 9/00; G06F 7/00; G09G 5/02
(52) U.S. Cl. ..................... 713/100; 707/527; 345/594
(58) Field of Search .................. 713/100; 707/527; 345/594, 650, 661, 676, 700, 747, 759, 762, 778

(56) References Cited

U.S. PATENT DOCUMENTS 5,307,086 A * 4/1994 Griffin et al. ............... 345/808
5,953,007 A * 9/1999 Center et al. .............. 345/764

FOREIGN PATENT DOCUMENTS

JP 2000185446 A * 7/2000 ............ B41J/21/00

OTHER PUBLICATIONS

Nunnally et al, Mainframe—Page Preview, 1991, IEEE.*

* cited by examiner

Primary Examiner—Dennis M. Butler
Assistant Examiner—Suresh K Suryawanshi
(74) Attorney, Agent, or Firm—Fitzpatrick, Cella, Harper & Scinto

(57) ABSTRACT

To provide a print set picture plane which can be easily used and understood by the user, in order to realize a technique for enabling a print setup in another set picture plane to be easily recognized, there is provided an information processing apparatus which is connected to an external device and performs a setup to control the external device by using a plurality of set sheets. In an arbitrary set sheet, various set items are set and a window to visually express the set contents which were set is switched to a window of another set sheet.

17 Claims, 11 Drawing Sheets

FIG. 10

PROFILE:

INFORMATION | DETAIL | PAGE SETUP | FINISHING | PAPER SOURCE | QUALITY | CONFIGURATION

DEFAULT SETTINGS ▶   ADD...   EDIT...

PAPER SELECTION
- ○ SAME PAPER FOR ALL PAGES
- ○ DIFFERENT FOR FIRST, OTHERS, AND LAST
- ⦿ DIFFERENT FOR FIRST, SECOND, OTHERS, AND LAST
- ○ TRANSPARENCY INTERLEAVING

DESIGNATE FIRST PAGE SOURCE

DESIGNATE SECOND PAGE SOURCE

✓ DESIGNATE OTHER PAGES SOURCE

DESIGNATE LAST PAGE SOURCE

LETTER (SC

FINISHING — 1001

OK   CANCEL   UPDATE   HELP

1002
- GROUP
- ✓ COLLATE
- ROTATE – GROUP
- ROTATE – COLLATE

FIG. 11

PROFILE:

PAPER SELECTION
- SAME PAPER FOR ALL PAGES
- DIFFERENT FOR FIRST, OTHERS, AND LAST
- DIFFERENT FOR FIRST, SECOND, OTHERS, AND LAST
- TRANSPARENCY INTERLEAVING

DESIGNATE BINDING LOCATION
DESIGNATE STAPLE POSITION

PRINT STYLE — 1101

LETTER (SCALING: AUTO)

1102
- ✓ 1-SIDED PRINTING
- 2-SIDED PRINTING
- BOOKLET PRINTING

OK  CANCEL  UPDATE  HELP

SYSTEM PROVIDING SWITCHING MEANS ON PRINT SETUP PREVIEW SCREEN THEREBY SWITCHING TO ANOTHER PREVIEW SCREEN CORRESPONDING TO ANOTHER SET SHEET, ALTERING SETTINGS

BACKGROUND OF THE INVENTION

1. Field of the Invention

The invention relates to an information processing apparatus for performing a setup to control a device, its device setting method, and a memory medium in which a device driver program has been stored. More particularly, the invention relates to an information processing apparatus having means for performing various setups on a device set picture plane which is provided on an information processing apparatus such as a personal computer or the like, its device setting method, and a medium on which its device driver program has been recorded.

2. Related Background Art

In a conventional print system, in the case where the system has a plurality of print set picture planes and a preview picture plane to display set contents of the set picture planes, means for changing the setup on the set picture plane is not provided on the preview picture plane or, even if such means is provided, means for changing the setup on the set picture plane is merely provided. Therefore, if the user tries to change the print setup belonging to another set picture plane, it is necessary to switch the print set picture plane by the operation such as button operation, switching of a tab sheet, or the like.

Such conventional processes will now be described with reference to FIGS. 1 and 2.

FIG. 1 shows a user interface picture plane of a print setup in a printer driver of Canon Inc. (registered trademark) corresponding to Windows 95 (registered trademark of Microsoft Corporation in U.S.A.).

In the diagram, reference numeral 101 denotes a set picture plane switching button and a plurality of sheet names for print setup are shown. In FIG. 1, a set picture plane of "page setup" is shown. As shown at 102, a paper size, the number of output copies, a direction of the paper, a page layout, a stamp function, and the like can be set. Reference numeral 103 denotes a preview picture plane. A print preview is displayed in accordance with the set items set on the set picture plane 102 which is opened at present. In the preview picture plane 103 in FIG. 1, preview set items of "A4", "portrait", and "1 page per sheet" are displayed.

In the recent printer driver, there are a variety of print purposes and there is a printer driver having a complicated print setup. To provide a wide degree of freedom for the print setup, a plurality of set picture planes (set sheets) are needed.

To change each set item, the user selects "page setup" by the set picture plane switching button 101 by using a pointing device such as a mouse or the like and switches the set picture plane to the "page setup" set picture plane. The change of the set items can be realized by selecting desired set items as shown at 102 after the switching. For example, when the setup of "page layout" is changed from "1 page per sheet (standard)" to "4 pages per sheet", an example of the print set picture plane just after the setup of "page layout" was changed is as shown in FIG. 2. The preview picture plane 103 and a print set item 201 show the contents of "4 pages per sheet".

In the conventional print system, however, in the case where a setup is performed on a certain set picture plane, if the user tries to change the setup of another set picture plane, it is necessary to switch the print set picture plane itself including the preview picture plane as mentioned above. Therefore, since the user cannot simultaneously see the setup on the set picture plane before switching and the setup on the set picture plane after the switching, a use efficiency is not good for the user who changes a plurality of setups. It is also necessary to often switch the picture plane in order to confirm the set contents, and the like. There is a problem such that it is difficult for the user to understand the setup changing operation.

SUMMARY OF THE INVENTION

The invention is made in consideration of the conventional system and it is the first object of the invention to provide a technique such that in order to provide a print set picture plane which can be easily used and understood for the user, on a preview picture plane of an arbitrary set picture plane, a preview picture plane of another set picture plane is switched and displayed, thereby enabling a print setup on another set picture plane to be easily recognized.

It is the second object of the invention to provide a technique such that, on a preview picture plane of an arbitrary set picture plane, a preview picture plane of another set picture plane is switched and displayed, and thereafter, and a print setup associated with the switched preview picture plane is changed by an operation on the switched preview picture plane, thereby enabling a print setup on another set picture plane to be easily changed.

To accomplish the above objects, according to the invention, there is provided an information processing apparatus which is connected to an external device and performs a setup to control the external device by using a plurality of set sheets, comprising: first setting means for setting various set items on an arbitrary set sheet; and switching means for switching a window to visually express set contents set by the first setting means to a window of another set sheet.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a user interface diagram showing a picture plane for setting set items in a preview picture plane regarding "paper source" in the embodiment; and FIG. 11 is a user interface diagram showing a picture plane for setting set items in a preview picture plane regarding "finishing" in the embodiment.

DETAILED DESCRIPTION OF THE PREFERRED EMBODIMENTS

First Embodiment

A print system including an information processing apparatus suitable for applying the invention will now be described hereinbelow.

Figure 3:
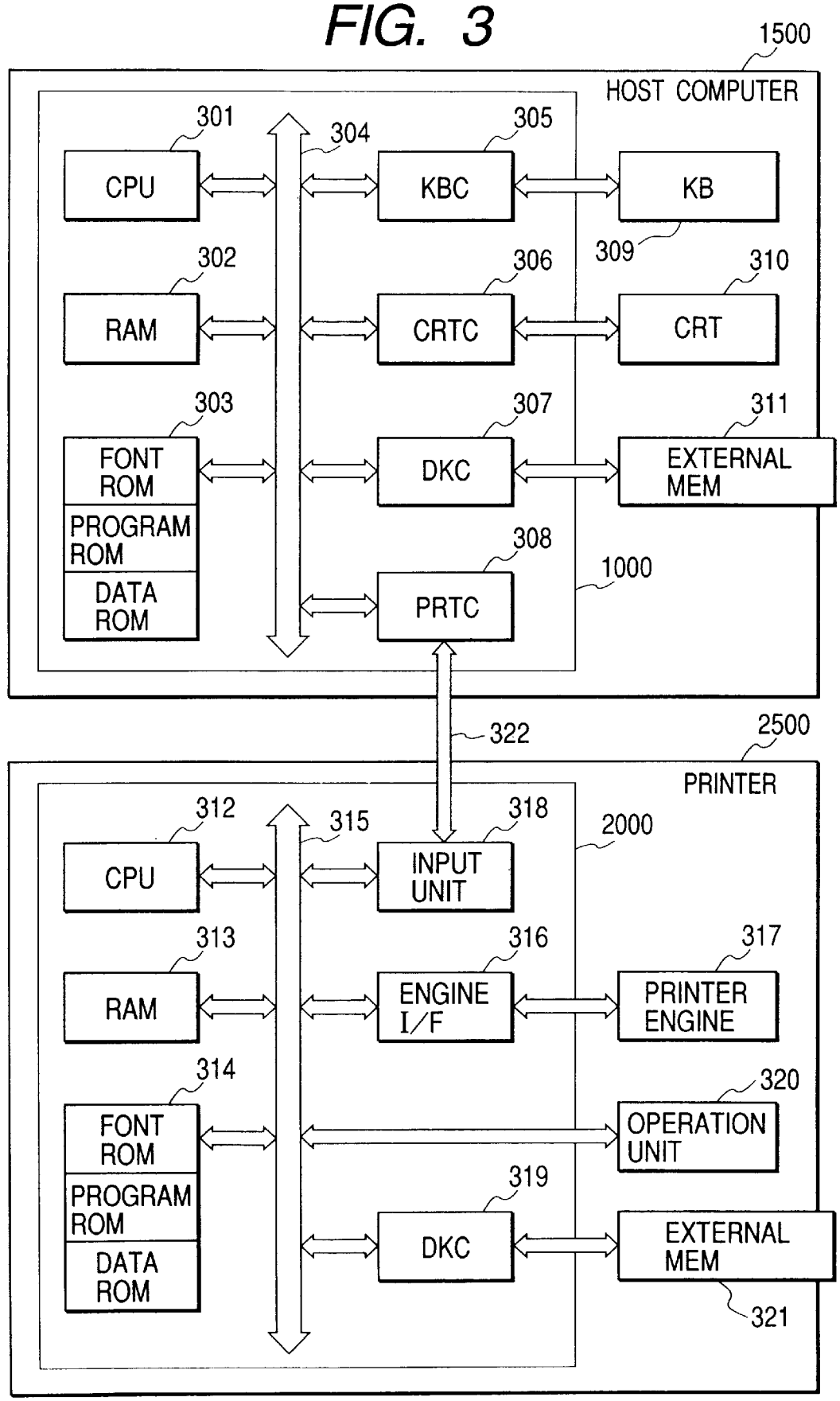
FIG. 3 is a block diagram for explaining a construction of a print system including an information processing apparatus according to an embodiment of the invention.

FIG. 3 is a block diagram for explaining a construction of the print system showing an embodiment of the invention. The invention can be obviously applied to any of a system comprising one apparatus, a system comprising a plurality of apparatuses, and a system which is connected through a network such as LAN, WAN, or the like and in which processes are executed so long as functions of the invention are executed, unless otherwise specified.

In FIG. 3, reference numeral 1500 denotes a host computer having a CPU 301 for executing processes of a document in which a figure, an image, characters, a table (including a spreadsheet, etc.), and the like mixedly exist on the basis of a document processing program or the like stored in a program ROM in an ROM 303 or an external memory 311. The CPU 301 integratedly controls various devices connected to a system bus 304.

An operating system program (hereinafter, simply referred to as an OS) as a control program of the CPU 301 and the like are stored in the program ROM in the ROM 303 or the external memory 311. Font data and the like which are used at the time of the document processes are stored in a font ROM in the ROM 303 or the external memory 311. Various data which is used when the document processes or the like are executed is stored in a data ROM in the ROM 303 or the external memory 311.

Reference numeral 302 denotes an RAM functioning as a main memory, a work area, or the like of the CPU 301; 305 a keyboard controller (KBC) for controlling a key input from a keyboard 309 or a pointing device (not shown); 306 a CRT controller (CRTC) for controlling a display of a CRT display (CRT) 310; and 307 a disk controller (DKC) for controlling an access to the external memory 311 such as hard disk (HD), floppy disk (FD), or the like for storing a boot program, various applications, font data, a user file, an edit file, a printer control command forming program (hereinafter, referred to as a printer driver), and the like. Reference numeral 308 denotes a printer controller (PRTC) which is connected to a printer 2500 through a predetermined bidirectional interface (hereinafter, referred to as an interface) 322 and executes a communication control process with the printer 2500.

The CPU 301 executes, for example, a developing (rasterizing) process of an outline font into a display information RAM set on the RAM 302, thereby enabling WYSIWYG to be realized on the CRT 310. The CPU 301 opens various registered windows and executes various data processes on the basis of commands instructed by a mouse cursor or the like (not shown) on the CRT 310. When the user executes a print, he opens a window regarding the setup of the printing and can set a desired printer and set a print processing method for the printer driver including the selection of a print mode. It is assumed that the printer driver program of the invention has been stored in the external memory 311.

In the printer 2500, reference numeral 312 denotes a printer CPU which outputs an image signal as output information to a printer engine 317 connected to a system bus 315 on the basis of a control program or the like stored in a program ROM in an ROM 314 or a control program or the like stored in an external memory 321. A control program of the CPU 312 and the like are stored in the program ROM in the ROM 314. Font data and the like which are used when output information is formed are stored in a font ROM in the ROM 314. In case of a printer without the external memory 321 such as a hard disk or the like, information which is used on the host computer and the like are stored in a data ROM in the ROM 314. The CPU 312 can perform a communicating process with the host computer through an input unit 318 and can notify the host computer 1500 of the information in the printer or the like.

Reference numeral 313 denotes an RAM functioning as a main memory, a work area, or the like of the CPU 312. A memory capacity of the RAM 313 can be expanded by an option RAM connected to an expansion port (not shown). The RAM 313 is used as an output information developing area, an environment data storing area, an NVRAM, or the like. An access to the external memory 321 such as hard disk (HD), IC card, or the like is controlled by a disk controller (DKC) 319.

The external memory 321 is connected as an option and stores font data, an emulation program, form data, and the like. Reference numeral 320 denotes an operation unit on which switches for operation, an LED display, and the like are arranged. The number of external memory is not limited to one. The external memory can be constructed in a manner such that at least one or more memories are provided and a plurality of option font cards in addition to built-in fonts and a plurality of external memories in which a program to interpret printer control languages of different language systems has been stored can be connected. Further, it is also possible to have an NVRAM (not shown) and store printer mode set information from the operation unit 320.

Figure 4:
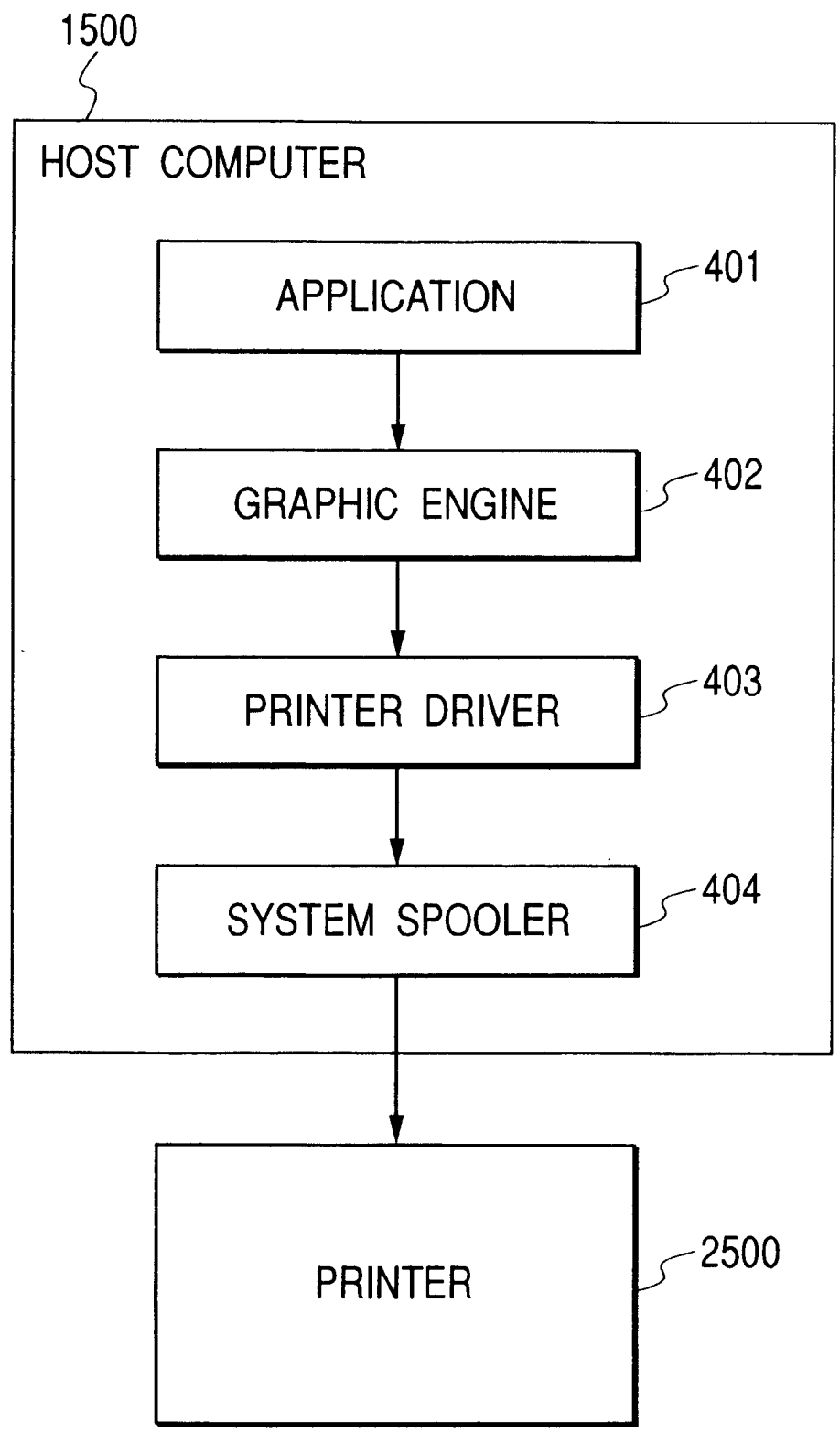
FIG. 4 is a block diagram for explaining a typical print data forming method in a host computer.

FIG. 4 is a constructional diagram of a typical printing process in the host computer to which a printing apparatus such as a printer or the like is directly connected or connected via the network.

An application 401, a graphic engine 402, a printer driver 403, and a system spooler 404 are program modules which exist as files held in the external memory 311 and each of which is loaded into the RAM 302 by the OS or a module using such a module and executed when it is executed.

The application 401 and printer driver 403 can be added to the FD or a CD-ROM (not shown) of the external memory 311 or an HD of the external memory 311 via the network (not shown). Although the application 401 held in the external memory 311 is loaded into the RAM 302 and executed, when a printing is performed from the application 401 to the printer 2500, and an output (drawing) is performed by using the graphic engine 402 which is similarly loaded into the RAM 302 and is in the operative mode. Although data that is outputted to the graphic engine by the application differs depending on the kind of OS, for example, in case of using Windows (registered trademark of Microsoft Corporation), a GDI function is outputted as a draw command to the GDI as a graphic engine.

The graphic engine 402 similarly loads the printer driver 403 prepared for every printing apparatus into the RAM 302 from the external memory 311, converts the GDI (Graphic Device Interface) function as an output of the application 401 to a DDI (Device Driver Interface) function, and outputs it to the printer driver 403.

On the basis of the DDI function received from the GDI, the printer driver 403 converts it to a printer control command comprising a PDL (Page Description Language) which can be interpreted in the printer 2500 or image data at a low level. The converted printer control command is outputted to the printer 2500 via the interface 322 through the system spooler 404 loaded in the RAM 302 by the OS.

FIGS. 5 to 11 are diagrams showing an example of a setup change in a print set picture plane in the embodiment. The embodiment will now be described in detail hereinbelow with reference to FIGS. 5 to 11.

Figure 5:
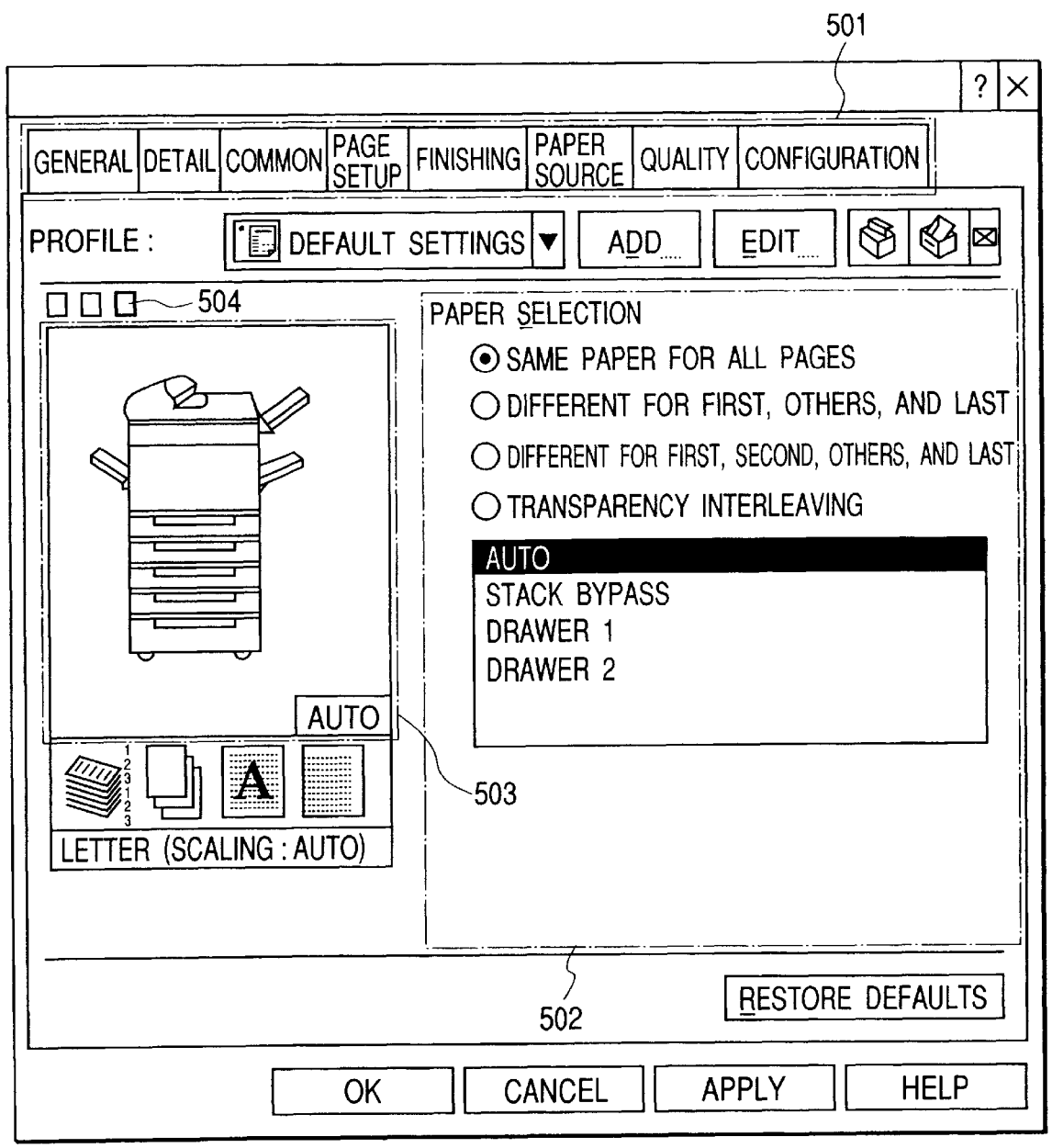
FIG. 5 is a user interface diagram of a print set picture plane printer driver in the embodiment.

First, an example of the print set picture plane used in the embodiment is as shown in FIG. 5, it has a plurality of set picture planes, and they can be switched by a set picture plane switching button 501 provided in the upper portion. Besides, print set items 502 to actually perform a print setup is arranged in the set picture plane together with a preview picture plane switching button 504 and a preview picture plane 503 which are characteristic component elements in the embodiment. In the diagram, the set picture plane switching button 501, print set items 502, and preview picture plane 503 are the same as those of the conventional apparatus, their descriptions are omitted here.

The user can switch the preview picture plane 503 by the operation of the preview picture plane switching button 504. In the embodiment, as shown in FIG. 5, three kinds of preview picture planes can be selected and their corresponding buttons are associated with a "Page Setup (page setting)" set picture plane, a "Finishing" set picture plane, and a "Paper Source (paper feed)" set picture plane from the left, respectively. Since a "Quality (print quality)" set picture and a "Configuration (setup of a device)" set picture plane do not have a preview picture plane, there is not the preview picture plane switching button 504 regarding the set picture planes other than those three set picture planes.

In the embodiment, a procedure for performing the following setup changes among a number of print set items shown on a plurality of set picture planes will now be described as an example.

<Operation>

1. The setup of "Paper Selection (paper feeding method)" is changed from "Auto (automatic)" to "Drawer1 (cassette 1)".
2. The setup of "Page Layout" is changed from "1 page per sheet" to "4 pages per sheet".
3. The setup of "Paper Selection (paper feeding method)" is again confirmed.

In case of performing the changing operation by using the print set picture plane shown in FIG. 5 as a start point, since the set item of "Paper Selection (paper feeding method)" is arranged on the set picture plane of "Paper Source (paper feed)", it can be changed here. With respect to the change, the user moves a cursor onto the preview picture plane as shown at 601 in FIG. 6 by using the pointing device such as a mouse or the like and can select a paper feed port by clicking the left button of the mouse on the preview picture plane. Besides this operation, the user can also perform the changing operation by selecting a set item as shown at 602 as in a conventional manner. Subsequently, the setup of "Page Layout" is changed.

Figure 8:
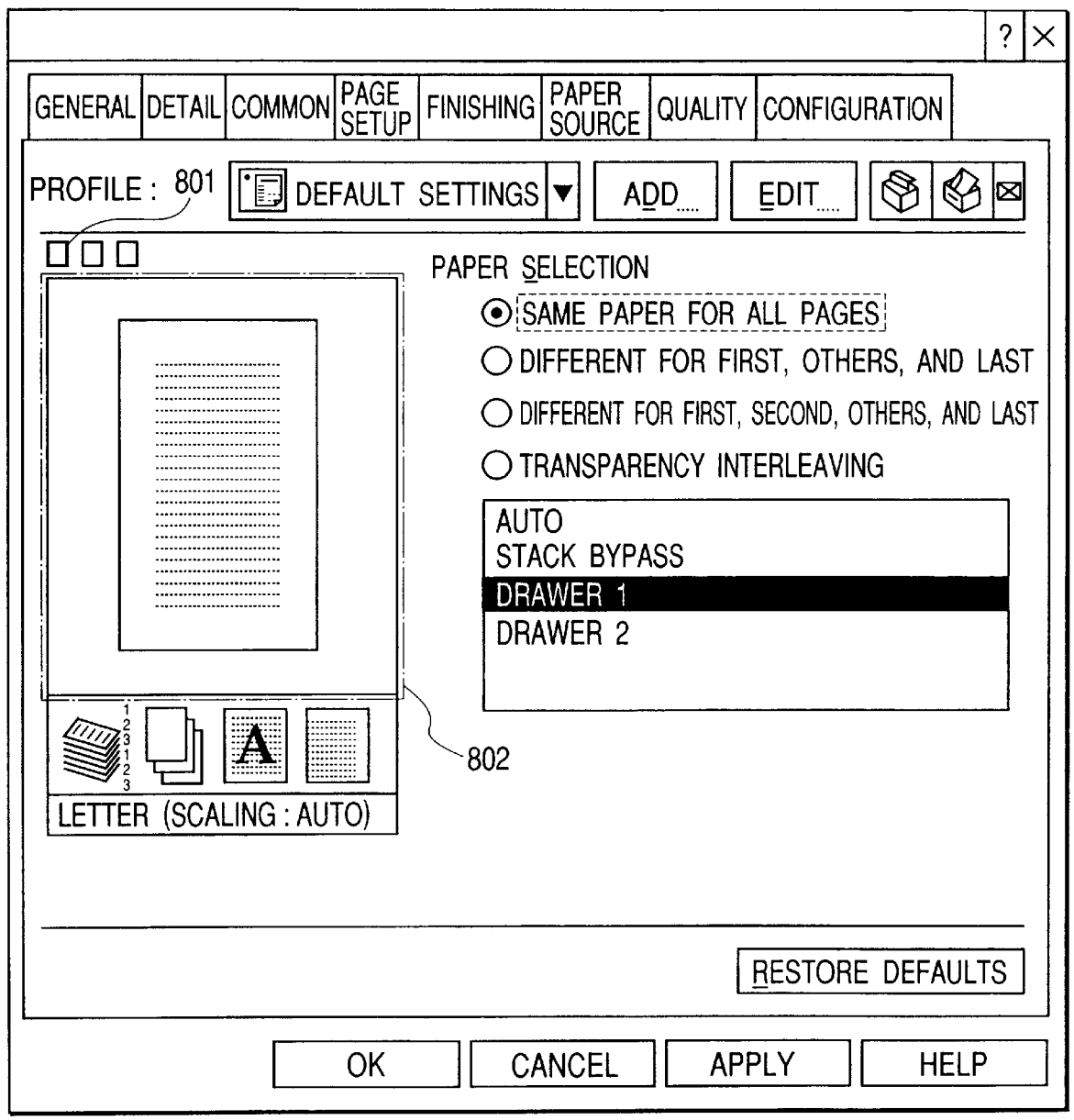
FIG. 8 is a user interface diagram of the print set picture plane just after the switching of the preview picture plane in the printer driver of the invention.

In case of subsequently performing the change of 2, a cursor 701 is moved to the switching button 504 of the preview picture plane by using the pointing device such as a mouse or the like. The preview picture plane 503 is switched from the picture plane associated with "Paper Selection (paper feed)" to the picture plane associated with "Page Setup (page setting)" by the operation of the first left button showing "Page Setup (page setting)". FIG. 8 shows an example of the print set picture plane after the switching.

In FIG. 8, the set picture plane is in a display state of "Paper Source (paper feed)" and only the preview picture plane is switched as shown at 802.

As mentioned above, by providing the preview picture plane switching button 504, only the preview picture plane can be switched in the set picture plane, and the use efficiency is improved for the user.

Figure 6:
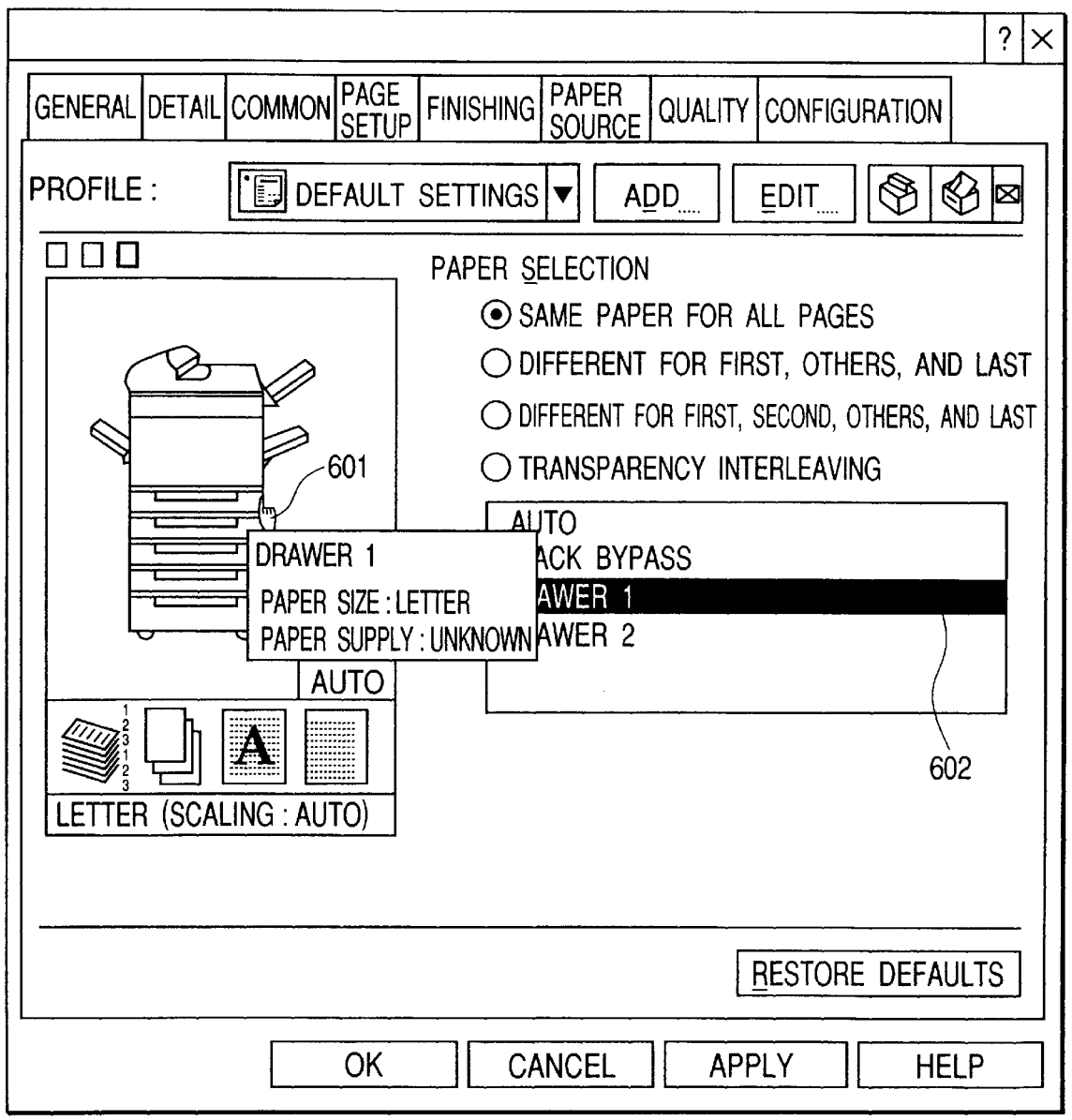
FIG. 6 is an example of a print set picture plane for changing a setup of a paper selection in the printer driver of the embodiment.
Figure 7:
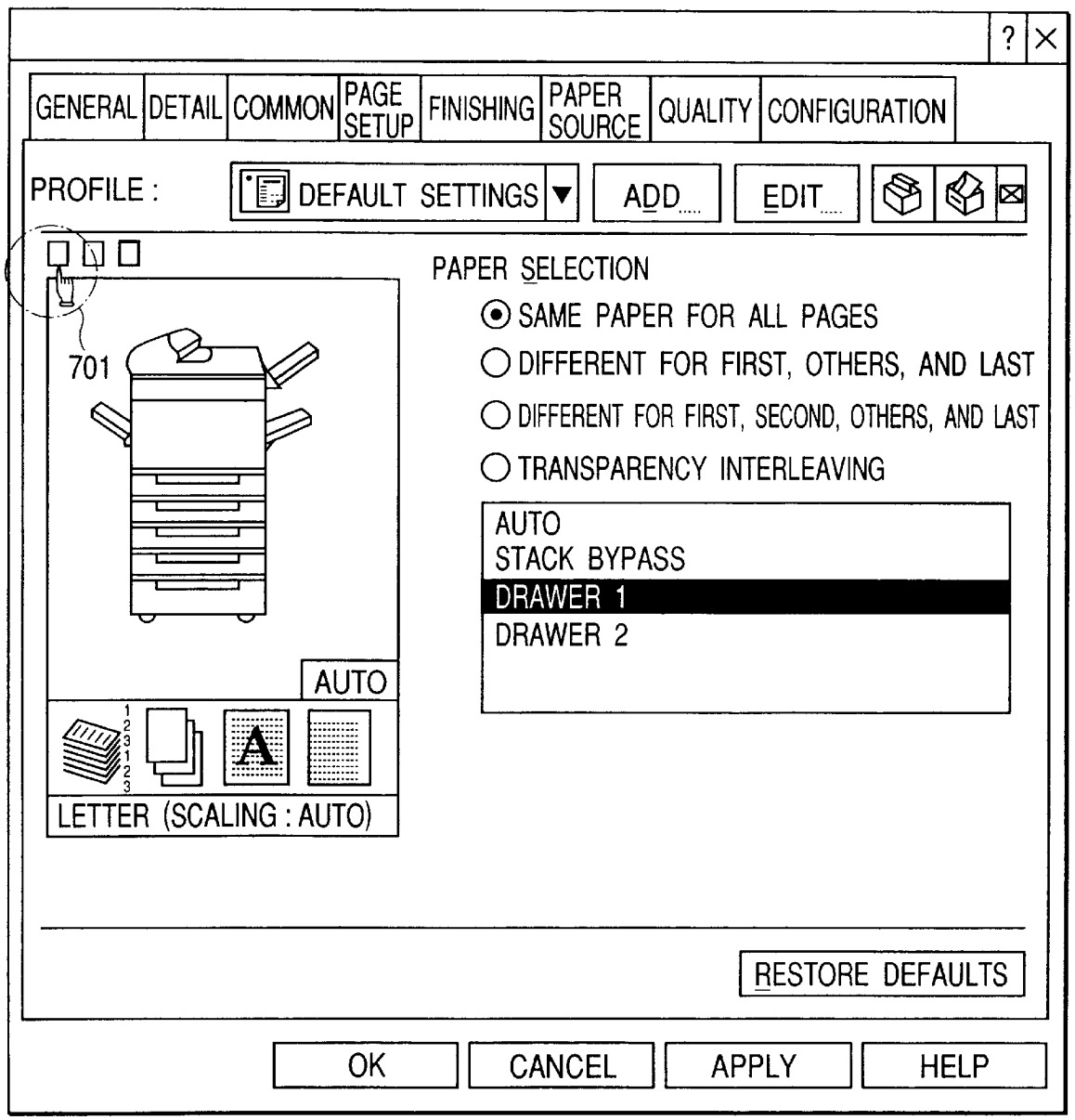
FIG. 7 is a diagram showing an example of a method of switching a preview picture plane in the printer driver of the invention.

Subsequently, as described in FIGS. 5 and 6, even in the set picture plane of "Paper Source", the user can change the setup of "Page Layout" on the preview picture plane by the pointing device such as a mouse or the like.

Figure 9:
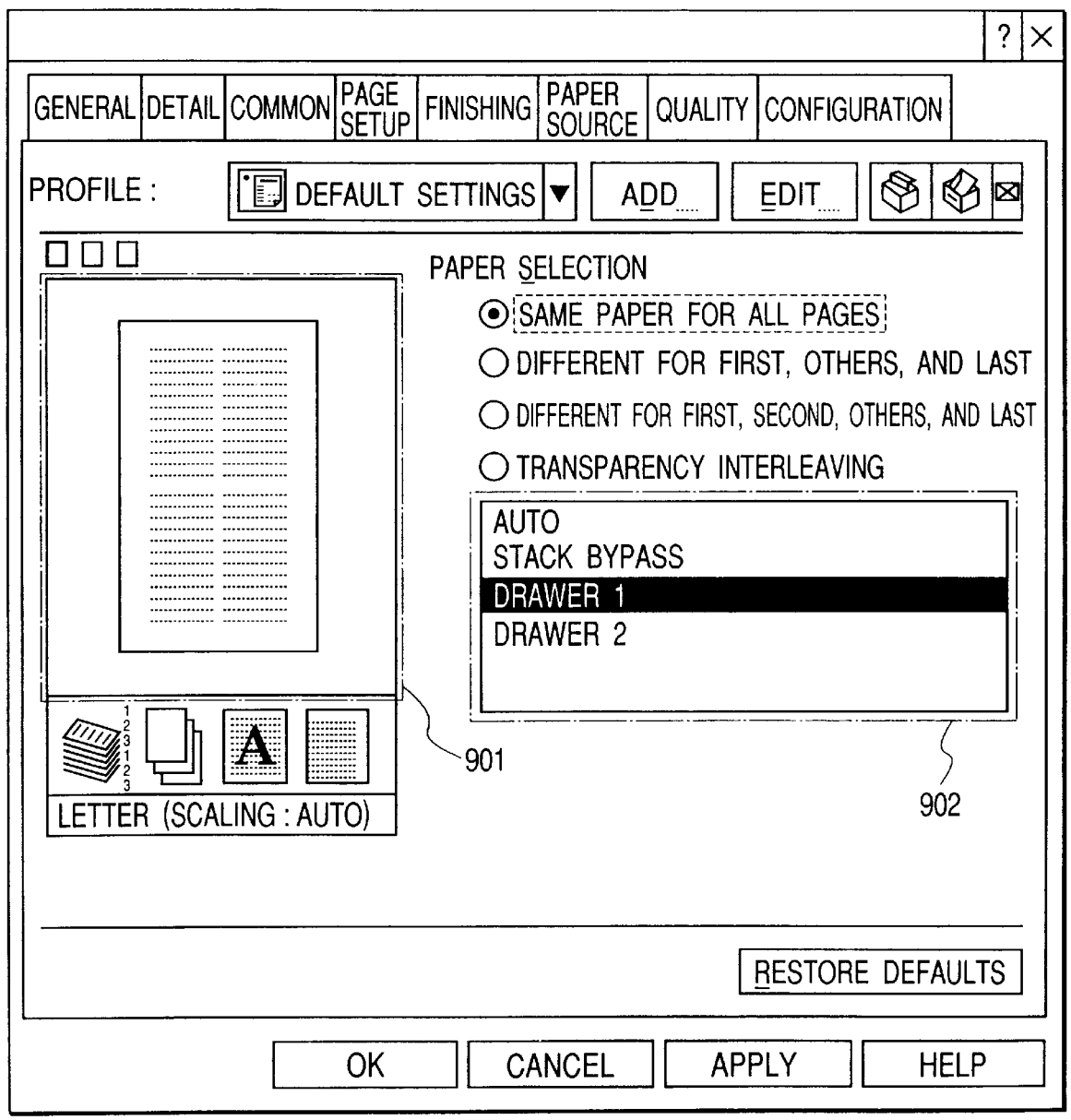
FIG. 9 is a diagram showing an example of the print set picture plane just after the change of a page layout on the preview picture plane according to the embodiment.

FIG. 9 shows an example of the "Paper Source (paper feed)" set picture plane after completion of the above operation. It shows that "Page Layout" is set to "4 Pages Per Sheet" on a preview picture plane 901. A situation of "Paper Selection (paper feeding method)" is also displayed in a preview picture plane 902. When the user operates the mouse, selects "Page Setup (page setting)" by the set picture plane switching button 501, and switches the set picture plane to the "Page Setup (page setting)" set picture plane, the picture plane of FIG. 6 is displayed in a manner similar to the conventional system and he can confirm that "Page Layout" has been changed to "4 Pages Per Sheet".

By the above processes, the user changes the set values variably existing on a plurality of set picture planes by the simple operation and can easily confirm the change results.

Second Embodiment

In the first embodiment, the display of only the preview picture plane of another set picture plane can be switched from an arbitrary set picture plane and, further, the set items of another set picture plane can be switched from the arbitrary set picture plane by the operation of the preview picture plane.

However, there are a variety of set items on each set picture plane (set sheet) and all of the set items cannot be operated only by the clicking operation on the preview picture plane. It is an object of the second embodiment, therefore, to enable the switching of the set items by the operation of the preview picture plane to be performed with respect to all of the set items on the set sheet corresponding to the preview picture plane. Explanation in such a case will now be described with reference to FIGS. 10 and 11.

In FIG. 10, the item setup in the preview picture plane on the "Paper Source (paper feed)" set picture plane will be described. In FIG. 10, when the user moves the cursor of the mouse onto the preview picture plane and clicks the right button of the mouse, a window 1001 is displayed. Since the paper feeding method has been set to "Different for First, Second, Others, and Last", a paper feed source of each page of one job has to be selected. Although it can be set by the set item 602 shown in FIG. 6, in case of setting the paper feed source by the switching of the preview picture plane from the different set sheet, it is selected from the window 1001. In "Designate First Page Source", the paper feed source of the first page is selected. By checking here, the paper feed source (manual or cassette) can be selected in the main diagram in the preview picture plane by clicking the left button of the mouse. One of "Designate Second Page Source", "Designate Other Page Source", and "Designate Last Page Source" can be selected in this instance.

"Finishing (setup of a paper delivery method)" can be also selected. That is, in case of printing a plurality of copies, in a set item of "Group", the print papers are outputted on a page unit basis every number of output copies. In a set item of "Collate", the print papers are outputted on a job unit basis every number of output copies. When the user checks "Rotate-Group" or "Rotate-Collate", a "rotate command" is added to the print data which is generated by the printer driver. The printer which received the rotate command discriminates whether the papers of the designated size and different paper directions have been set or not. If YES, the following processes are executed. That is, in case of the A4 landscape and the "Group" output, the page is printed and outputted by the number of output copies and, thereafter, the direction of the image data to be formed from the print data is rotated by 90° and the printing process is performed to the papers of A4 portrait. In case of A4 landscape and the "Collate (sort)" output, the page of the first copy of the job is printed and outputted and, thereafter, the direction of the image data to be formed from the print data is rotated by 90° and the printing process of the page of the next second copy is performed to the papers of A4 portrait. The above operations are repeated until the last one of the output copies. By the above function, the user can process the above operations by the printer without needing to purposely copy references for a plurality of persons by the copying machine. Even in case of the printer without a sorter, since the directions of the copies are different, there is an effect that the user can easily sort them.

As described above, by the operation on the preview picture plane, a plurality of print setups on the set sheet can be performed.

In FIG. 11, explanation will be made with respect to the case of switching the preview picture plane on the "Paper Source (paper feed)" set picture plane to that corresponding to a "Finishing" set picture plane by using the preview picture plane switching button 504.

As described in the first embodiment, after the preview picture plane was switched to the preview picture plane associated with "Finishing" by the preview picture plane switching button 504, when the user clicks the right button of the mouse on the preview picture plane, a window 1101 is displayed.

When the user checks "Designate Binding Location (designation of the binding direction)" in the window 1101, he can perform the operations of "major side binding" and "minor side binding" on the preview picture plane. That is, when the user moves the mouse cursor to the paper in the preview picture plane and clicks the left button of the mouse at a position of the major side portion, the "major side binding" is set. When the user clicks the left button of the mouse at a position of the minor side portion, the "minor side binding" is set.

Figure 1:
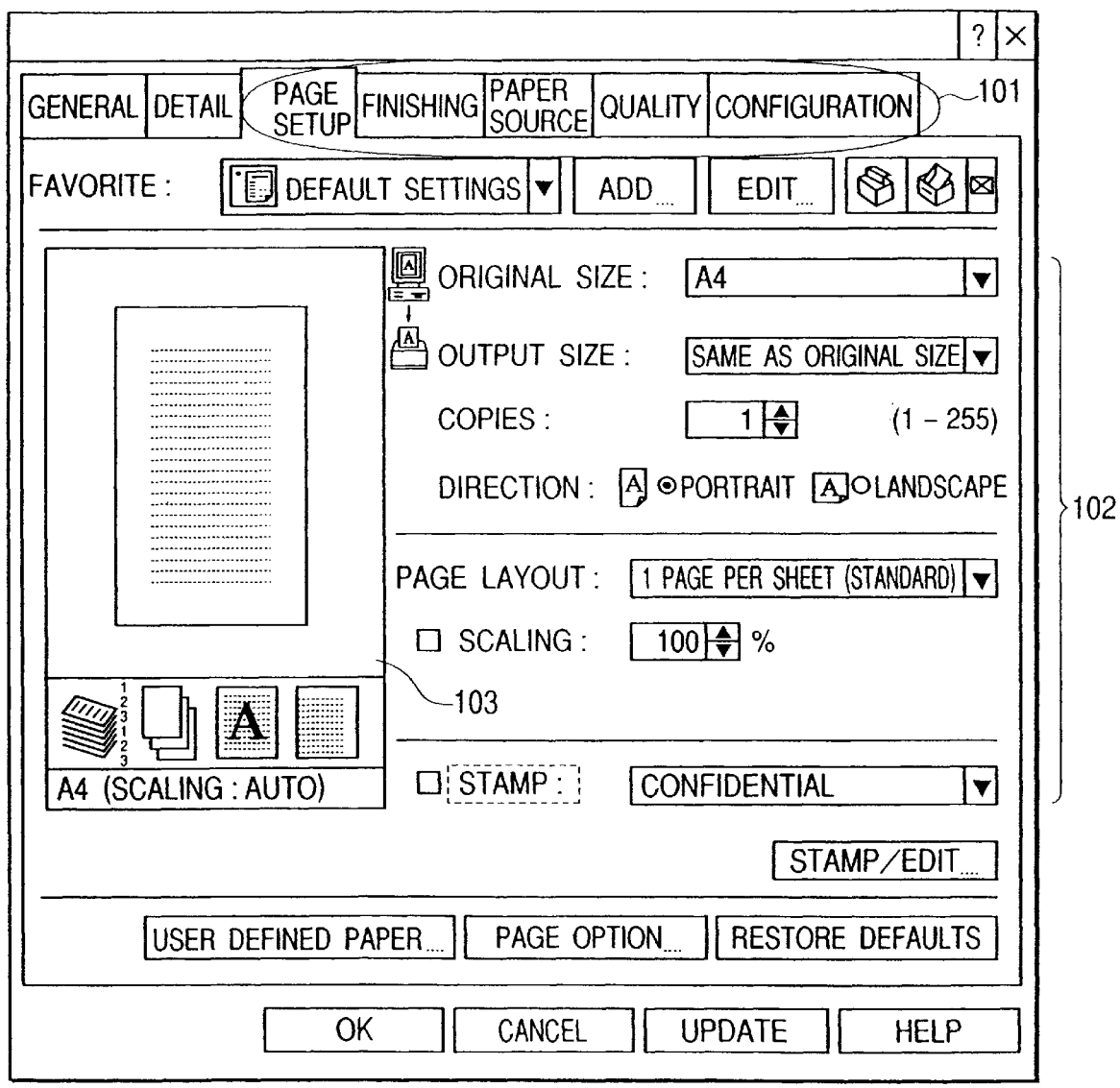
FIG. 1 is a user interface diagram of a picture plane of a print setup of a printer driver in a conventional example.
Figure 2:
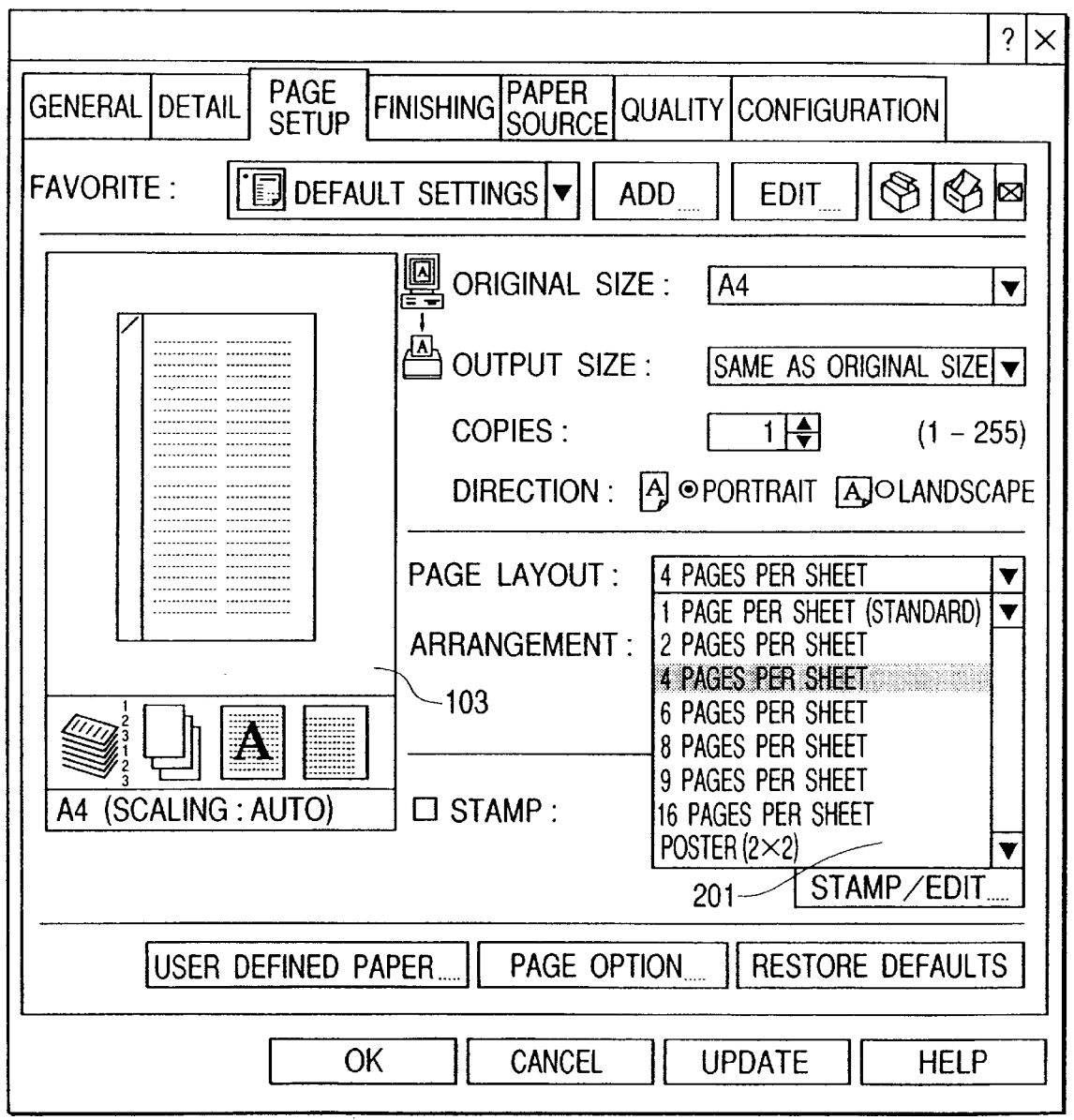
FIG. 2 is a user interface diagram of a print set picture plane when a setup of a page layout is changed in the conventional printer driver.

When the user checks "Designate Staple Position (designation of the stapling position)", he can perform the operation regarding the "Staple Position" on the preview picture plane. That is, when the user moves the mouse cursor to the paper in the preview picture plane and clicks the left button of the mouse at the corner of the side whose binding has been designated, "Staple" is designated. A staple preview as shown at 103 in FIG. 1 is displayed in the preview picture plane.

When the user checks "Print Style (printing method)", the printing method can be designated. It is designated in the window. When the user moves the mouse cursor to "Print Style", a new window 1102 is displayed. When "1-Sided Printing" is designated in the window 1102, the one-Sided printing is performed in the printer 2500. When "2-Sided Printing" is designated in the window 1102, the two-sided printing is performed in the printer 2500. A message indicating that a part of the paper in the preview picture plane is displayed in a turn-back state and the print data is also printed on the back side is displayed by switching the paper in the preview picture plane so as to enable the user to discriminate such a point. When "2-Sided Printing" is designated, a booklet printing is performed in the printer 2500. The paper in the preview picture plane is displayed in a double-page spread state. A message indicating that a booklet operation is performed is displayed by switching the paper in the preview picture plane so as to enable the user to discriminate such a point.

As described above, a plurality of print setups in another set sheet can be performed by the operation on the preview picture plane. A troublesomeness such that the user has to switch the setup sheet to another setup sheet to be set every time is reduced. The set items which have conventionally been set on a plurality of set sheets can be set on an arbitrary set sheet.

In the first and second embodiments, although the icon is used as a preview picture plane switching button 504, another means can be also used for a character indication or a switching. The invention can be also applied to a device driver portion of a system comprising a plurality of apparatuses (for example, a host computer, an interface device, a reader, a printer, etc.).

The objects of the invention are also accomplished by a method whereby a memory medium on which program codes of software such as a printer driver or the like to realize the functions of the embodiments mentioned above have been stored is supplied to a system or an apparatus, and a computer (or a CPU or an MPU) of the system or apparatus reads out and executes the program codes stored in the memory medium.

In this case, the program codes themselves read out from the memory medium realize the functions of the embodiments mentioned above and the memory medium in which the program codes have been stored constructs the invention.

As a memory medium to supply the program codes, for example, it is possible to use a floppy disk, a hard disk, an optical disk, a magnetooptic disk, a CD-ROM, a CD-R, a CD-RW, a magnetic tape, a non-volatile memory card, an MO, a DVD, an ROM, or the like.

The invention incorporates not only a case where the functions of the embodiments mentioned above are realized by executing the read-out program codes by the computer but also a case where the OS (Operating System) or the like which operates on the computer executes a part or all of the actual processes on the basis of instructions of the program codes and the functions of the embodiments mentioned above are realized by those processes.

Further, the invention also incorporates a case where the program codes read out from the memory medium are written into a memory equipped for a function expanding board inserted to a computer or a function expanding unit connected to the computer and, thereafter, a CPU or the like equipped for the function expanding board or function expanding unit executes a part or all of the actual processes on the basis of instructions of the program codes, and the functions of the embodiments mentioned above are realized by those processes.

Program codes themselves which are installed in a computer in order to realize the functions and processes of the invention by the computer also realize the invention. That is, Claims of the present invention also incorporate the computer program itself for realizing the functions and processes of the invention.

As a method of supplying the computer program, the invention is not limited to the case where the computer program is stored in the FD or CD-ROM and read out by the computer and installed in the computer as mentioned above. The computer program can be also supplied by a method whereby the client is connected to a homepage on the Internet by using a browser of the client computer and the computer program itself of the invention is downloaded from the homepage or a method whereby a compressed file including an automatic installing function is downloaded. The invention can be also realized by a method whereby the program codes constructing the program of the invention are divided into a plurality of files and each file is downloaded from a different homepage. That is, Claims of the invention also incorporate a WWW server for downloading a program file to realize the functions and processes of the invention by a computer to a plurality of users.

The invention can be also realized by a method whereby the program of the invention is enciphered and stored in a memory medium such as an FD or the like and distributed to the user, key information to decipher the encryption is downloaded from a homepage through the Internet to the user who cleared predetermined conditions, and the enciphered program is executed by using the key information and installed into a computer.

As many apparently widely different embodiments of the present invention can be made without departing from the spirit and scope thereof, it is to be understood that the invention is not limited to the specific embodiments thereof except as defined in the appended claims.

As described above, according to the embodiments, by switching only the preview picture plane without switching the print set picture plane, the set contents on the set picture plane other than the print set picture plane displayed at present are displayed and the set contents can be changed.

As described above, according to the embodiments, to provide a print set picture plane which can be easily used and understood by the user, it is possible to provide a technique such that the picture plane is switched so that on a preview picture plane of an arbitrary set picture plane, a preview picture plane of another set picture plane can be displayed, thereby enabling the print setup in another set picture plane can be easily recognized.

It is also possible to provide a technique such that on a preview picture plane of an arbitrary set picture plane, a preview picture plane of another set picture plane is switched and displayed by the operation on the switched preview picture plane, thereby changing the print setup associated with the switched preview picture plane and enabling the print setup in another set picture plane to be easily changed.

What is claimed is:

1. An information processing apparatus, which is connected to an external device and performs a setup to control the external device by using a plurality of set sheets, comprising:

first setting means for setting various set items in an arbitrary set sheet;

switching means for switching a window corresponding to the arbitrary set sheet, which visually expresses set contents set by said first setting means, to a new window corresponding to another set sheet; and second setting means for setting various set items in the other set sheet by an operation on the new window corresponding to the other set sheet, wherein, when the window corresponding to the arbitrary set sheet is switched by said switching means to the new window corresponding to the other set sheet, said second setting means performs a setup of the other set sheet.

2. An apparatus according to claim 1, wherein the external device is a printer and the various set items include a page layout and a paper feeding method.

3. An apparatus according to claim 2, wherein, in setting the paper feeding method, a paper feeding method of one of a first page, a second page, other page, and a last page of a print job may be set.

4. An apparatus according to claim 2, wherein the various set items further include a paper delivery method, and, in setting the paper delivery method, a plurality of output copies of a page unit or a job unit may be set, and, after print papers of a set number of output copies are outputted, a mode in which a printing direction is rotated and print papers of a next number of output copies are printed and outputted by the external device may be set in each of the page unit and the job unit.

5. An apparatus according to claim 2, wherein the various set items further include a printing method, and, in setting the printing method, one of a 1-sided printing, a 2-sided printing, a booklet printing may be set, and, when each printing method is set, a preview display of a window is visually changed.

6. A device setting method of performing a setup to control the external device by using a plurality of set sheets, comprising:

a first setting step of setting various set items in an arbitrary set sheet;

a switching step of switching a window corresponding to the arbitrary set sheet, which visually expresses set contents set in said first setting step, to a new window corresponding to another set sheet; and a second setting step of setting various set items in the other set sheet by an operation on the new window corresponding to the other set sheet, wherein, when the window corresponding to the arbitrary set sheet is switched in said switching step to the new window corresponding to the other set sheet, said second setting step performs a setup of the other set sheet.

7. A method according to claim 6, wherein the external device is a printer and the various set items include a page layout and a paper feeding method.

8. A method according to claim 7, wherein, in setting the paper feeding method, a paper feeding method of one of a first page, a second page, other page, and a last page of a print job may be set.

9. A method according to claim 7, wherein the various set items further include a paper delivery method, and, in setting the paper delivery method, a plurality of output copies of a page unit or a job unit may be set, and, after print papers of a set number of output copies are outputted, a mode in which a printing direction is rotated and print papers of a next number of output copies are printed and outputted by the external device may be set in each of the page unit and the job unit.

10. A method according to claim 7, wherein the various set items further include a printing method, and, in setting the printing method, one of a 1-sided printing, a 2-sided printing, a booklet printing may be set, and, when each printing method is set, a preview display of a window is visually changed.

11. A memory medium storing a device driver program for implementing a device setting method executed in an information processing apparatus connected to an external device, to perform a setup to control the external device by using a plurality of set sheets, wherein the device driver program comprises:

a program code of a first setting step of setting various set items in an arbitrary set sheet;

a program code of a switching step of switching a window corresponding to the arbitrary set sheet, which visually expresses set contents set in the first setting step, to a new window corresponding to another set sheet; and a program code of a second setting step of setting various set items in the other set sheet by an operation on the new window corresponding to the other set sheet, wherein, when the window corresponding to the arbitrary set sheet is switched in the switching step to the new window corresponding to the other set sheet, the second setting step performs a setup of the other set sheet.

12. A medium according to claim 11, wherein the external device is a printer and the various set items include a page layout and a paper feeding method.

13. A medium according to claim 12, wherein, in setting the paper feeding method, a paper feeding method of one of a first page, a second page, other page, and a last page of a print job may be set.

14. A medium according to claim 12, wherein the various set items further include a paper delivery method, and, in setting the paper delivery method, a plurality of output copies of a page unit or a job unit may be set, and, after print papers of a set number of output copies are outputted, a mode in which a printing direction is rotated and print papers of a next number of output copies are printed and outputted by the external device may be set in each of the page unit and the job unit.

15. A medium according to claim 13, wherein the various set items further include a printing method, and, in setting the printing method, one of a 1-sided printing, a 2-sided printing, a booklet printing may be set, and, when each printing method is set, a preview display of a window is visually changed.

16. A computer program product embodying a device driver program for implementing a device setting method executed in an information processing apparatus connected to an external device, to perform a setup to control the external device by using a plurality of set sheets, wherein the device driver program comprises:

a program code of a first setting step of setting various set items in an arbitrary set sheet;

a program code of a switching step of switching a window corresponding to the arbitrary set sheet, which visually expresses set contents set in the first setting step, to a new window corresponding to another set sheet; and a program code of a second setting step of setting various set items in the other set sheet by an operation on the new window corresponding to the other set sheet, wherein, when the window corresponding to the arbitrary set sheet is switched in the switching step to the new window corresponding to the other set sheet, the second setting step performs a setup of the other set sheet.

17. An information processing apparatus, which is connected to an external device and performs a setup to control the external device by using a plurality of set sheets, comprising:

a first setting unit, adapted to set various set items in an arbitrary set sheet;

a switching unit, adapted to switch a window corresponding to the arbitrary set sheet, which visually expresses set contents set by said first setting unit, to a new window corresponding to another set sheet; and a second setting unit, adapted to set various set items in the other set sheet by an operation on the new window corresponding to the other set sheet, wherein, when the window corresponding to the arbitrary set sheet is switched by said switching unit to the new window corresponding to the other set sheet, said second setting unit performs a setup of the other set sheet.

* * * * *